Patented Sept. 22, 1953

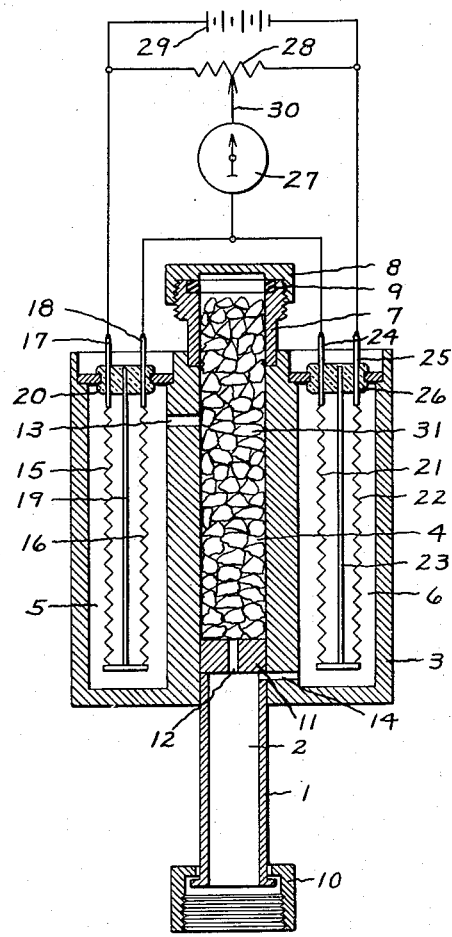

2,652,716

UNITED STATES PATENT OFFICE 2,652,716

APPARATUS FOR DETECTING LEAKS IN VACUUM SYSTEMS

Jack Blears, Davenham, and John Henry Leck, Stretford, England, assignors to General Electric Company, a corporation of New York Application November 18, 1949, Serial No. 128,182
In Great Britain November 29, 1948

8 Claims. (Cl. 73—40)

1

This invention relates to apparatus for detecting leaks in vacuum systems; and in particular to the detection of such leaks by the application, usually in the form of a spray, of a preselected gas or vapour, generally referred to as the "probe" medium, so that it passes into the vacuum system along any leakage path which may be available, and by the use in association with the vacuum system of detecting means selectively responsive to the probe medium though insensitive to air or other ambient fluid which may normally be leaking into the vacuum system.

One form of detecting means which can be employed for the purpose in view is the mass spectrometer, inasmuch as it can be arranged to respond only to a preselected gas, such for example as helium of mass 4 or the methyl radical of methane. However, a serious disadvantage of the mass spectrometer is its relatively high cost.

In another arrangement which involves the use as the probe medium of a gas which is condensable in liquid air, the detecting means includes two Pirani gauges which are identical except that one has an associated liquid air trap; the gauges are differentially connected in an electric bridge network so that the bridge is normally in balance notwithstanding leakage of air into, and fluctuations of pressure in, the vacuum system; whereas, when the probe medium is applied to the exterior of the vacuum system, any leakage of said medium into the vacuum system becomes condensed in the liquid air trap and produces a fall of pressure at the associated Pirani gauge, while the pressure at the other gauge remains sensibly unaltered, with the result that the bridge becomes unbalanced thus indicating the existence and extent of leak into the vacuum system. Among the disadvantages of this arrangement are those involved in the use of liquid air; namely the relatively high cost and the difficulty of procuring liquid air, and also its tendency to produce drifts in the sensitive elements which may persist for several hours after commencement of the leakage detection. Moreover, whereas the condensable gas most satisfactory from the point of view of leakage detection is butane, this gas when used in appreciable quantity has an objectionable smell and also may give rise to explosive atmospheres.

According to the present invention, in an improved arrangement for the detection of leakage into a vacuum system, two electro-responsive vacuum gauges are arranged, one to have direct communication with the evacuated space of the vacuum system and the other for communication with said evacuated space along a path in which is disposed a substance adapted to absorb by chemical reaction the gas or vapour intended for use as the probe medium. The difference of pressure in the two gauges due to direct access of probe medium to the one gauge and chemical absorption of probe medium in passage to the other gauge affects the electrical balance of a bridge circuit to afford an indication of leakage into the vacuum system.

With the improved arrangement, it is contemplated to use as the probe medium any suitable gas which is nontoxic, nonexplosive and free from noxious smell, such for example as carbon dioxide; substances eminently suited for absorbing carbon dioxide by chemical action therewith are the hydroxides of the alkaline earth metals such as barium hydroxide and calcium hydroxide.

In practising the invention it is preferred to employ electro-responsive gauges of the thermal conductivity or ionization types. Advantageously, the gauges may be housed in separate compartments of a common housing which preferably includes an additional compartment for accommodation of the chemical reagent. Access of gases within the vacuum system to the compartment containing the chemical reagent and from this compartment to the compartment for one of the gauges, as also the direct access to the other gauge, is preferably afforded through flow constrictors suitably adjusted to give the best performance.

An object of this invention is to provide improved, relatively inexpensive apparatus for detecting leaks in a vacuum system. Other objects and advantages will appear as the description proceeds. Features of the invention which are believed to be novel and patentable are pointed out in claims which form a part of this specification.

For a better understanding of the invention reference is made in the following description to the accompanying drawing in which the single figure is a schematic diagram, partly in section, of a preferred embodiment of the invention.

Referring to the drawing, inlet pipe 1 has walls defining a first passageway 2. A housing preferably comprising a copper block 3 has walls defining a second passageway 4 which passes through a central portion of the block as illustrated, and two recesses 5 and 6, one on either side of passageway 4. One end of passageway 4 may be closed by a tubular member 7 which is threaded to receive a removable cap 8. An air-tight seal is provided by gasket 9. The other end of passageway 4 is connected to one end of pipe 1 as shown. The other end of pipe 1 may be provided with a suitable connector 10 for connecting passageway 2 with the vacuum system.

Between passageway 2 and passageway 4 there is a flow-constricting plug 11 having a small axial bore 12 connecting the two passageways. Block 3 has a small transverse bore 13 forming a flow-constricting duct between recess 5 and a portion of passageway 4 remote from plug 11. Block 3 has another small transverse bore 14 forming a flow-constricting duct connecting recess 6 to passageway 2.

Vacuum gauges are located in recesses 5 and 6. Preferably Pirani gauges are employed. One of the Pirani gauges comprises resistance wires 15 and 16 connected in series between leads 17 and 18 and supported by a supporting member 19. Leads 17 and 18 pass through a glass seal 20 which closes recess 5. Within recess 6 there is a similar Pirani gauge comprising resistance wires 21 and 22, support 23, leads 24 and 25, and glass seal 26.

When an electric current is passed through the resistance element of a Pirani gauge, the rate of heat transfer from the resistance element, and hence the temperature of the resistance element, varies as a function of gas pressure within the recess containing the gauge. These temperature changes of the resistance element alter its electrical resistance, which may be measured by a suitable electrical circuit. A more complete discussion of Pirani gauges may be found on pages 318–330 of the book "Scientific Foundations of Vacuum Technique," by Saul Dushman, published by John Wiley and Sons, Inc., New York, 1949.

Preferably the two Pirani gauges are connected in adjacent branches of an electrical bridge circuit comprising galvonometer 27, tapped resistor 28, and voltage source 29 connected as shown. The bridge circuit may be balanced by adjusting tap 30 of resistor 28.

Passageway 4 is loosely packed with an absorbing material 31 which chemically absorbs the probe medium but which does not absorb air. When carbon dioxide gas is used as the probe medium, the absorbing material may be a hydroxide of an alkaline earth metal, as hereinbefore explained. Preferably, the absorbing material is in the form of sintered pellets held together by a suitable binder to give a less friable absorbent and more consistent gas flow conditions.

The flow-constricting ducts 12, 13, and 14 are designed to give sensibly equal gas flow time constants to the two gauge elements so that both long-term and short-term changes of the mean background pressure within the vacuum system are compensated.

In use, the apparatus is connected by means of connector 10 to a vacuum system to be tested for leaks. Preferably, the electrical bridge circuit is initially balanced by adjustment of tap 30 for zero indication of galvanometer 27. The probe medium, which may be carbon dioxide gas, is then sprayed upon portions of the vacuum system to be tested for leaks. If there is a leak in such portions, some of the probe medium enters the vacuum system.

Normally, any air leak into the vacuum system which passes through inlet pipe 1 is subdivided into two components, one component passing directly into recess 6 and the other component passing through absorbing material 31 into recess 5. Since air is unaffected by the absorbing material, it has the same effect upon both Pirani gauges, and the electrical bridge remains in balance. However, when any of the probe medium enters the vacuum system and passes into inlet pipe 1, the probe gas enters recess 6 but does not enter recess 5, since the probe medium reacts chemically with absorbing material 31. Since the probe gas does not enter recess 5, but air within the recess continues to diffuse out through flow-constricting duct 13, the pressure within recess 5 decreases, while the pressure within recess 6 remains constant or may rise slightly. Thus, presence of the probe medium creates a pressure difference between the two recesses 5 and 6. This pressure difference acts upon the two Pirani gauges to unbalance the electrical bridge circuit, whereby presence of the probe medium in the vacuum system is indicated by galvanometer 27.

Having described the principle of this invention and the best mode in which we have contemplated applying that principle, we wish it to be understood that the example described is illustrative only, and that other means may be employed without departing from the true scope of the invention.

What we claim as new and desire to secure by Letters Patent of the United States is:

1. Apparatus for detecting leaks which admit a gaseous probe medium into a vacuum system, comprising walls defining first and second passageways, means connecting said first and second passageways, means for connecting said first passageway to the vacuum system, gas-absorbing material within said second passageway, said material being of a kind which absorbs the probe medium but does not absorb air, first and second vacuum gauges, means connecting said first vacuum gauge to said first passageway, and means connecting said second vacuum gauge to the end of said second passageway not connected to said first passageway.

2. Apparatus for detecting leaks which admit a probe medium of carbon dioxide into a vacuum system, comprising walls defining first and second passageways, flow-constricting means connecting said first and second passageways, means for connecting said first passageway to the vacuum system, absorbing material within said second passageway, said absorbing material being of a kind which absorbs carbon dioxide gas but does not absorb air, first and second vacuum gauges, flow-constricting means connecting said first vacuum gauge to said first passageway, and flow-constricting means connecting said second vacuum gauge to the end of said second passageway remote from said first passageway whereby a medium must travel through said absorbing material before reaching said second vacuum gage.

3. Apparatus for detecting leaks which admit a probe medium of carbon dioxide into a vacuum system, comprising walls defining first and second passageways, flow-constricting means connecting said first and second passageways, means for connecting said first passageway to the vacuum system, absorbing material within said second passageway, said absorbing material being a hydroxide of an alkaline earth metal, first and second vacuum gauges, flow-constricting means connecting said first vacuum gauge to said first passageway, and flow-constricting means connecting said second vacuum gauge to the end of said second passageway remote from said first passageway whereby a medium must travel through said absorbing material before reaching said second vacuum gage.

4. Leak-detecting apparatus for detecting the presence of a probe medium in a vacuum system, comprising walls defining first and second passageways, flow-constricting means connecting said first and second passageways, means for connecting said first passageway to the vacuum system, absorbing material within said second passageway, said absorbing material being of a kind which chemically absorbs the probe medium but does not absorb air, first and second Pirani gauges, flow-constricting means connecting said first Pirani gauge to said first passageway, and flow-constricting means connecting said second Pirani gauge to the end of said second passageway remote from said first passageway whereby a medium must travel through said absorbing material before reaching said second Pirani gage.

5. Apparatus for detecting leaks which admit a probe medium into a vacuum system, comprising walls defining first and second passageways, flow-constricting means connecting said first and second passageways, means for connecting said first passageway to the vacuum system, absorbing material within said second passageway, said material being of a kind which absorbs the probe medium but does not absorb air, an electrical bridge circuit, first and second Pirani gauges differentially connected in said bridge circuit, flow-constricting means connecting said first Pirani gauge to said first passageway, and flow-constricting means connecting said second Pirani gauge to the end of said second passageway remote from said first passageway whereby a medium must travel through said absorbing material before reaching said second vacuum gage.

6. Apparatus for detecting leaks which admit a probe medium into a vacuum system comprising an inlet pipe having walls defining a first passageway, a block having walls defining two recesses and a second passageway extending through the block, an air-tight seal for closing one end of said second passageway, the other end of said second passageway being connected to one end of said inlet pipe, a connector at the other end of said inlet pipe for connecting said first passageway to the vacuum system, a flow-constricting plug having a small bore therethrough between said first and second passageways, said block having a small bore forming a flow-constricting duct between one of said recesses and a portion of said second passageway remote from said plug, said block having another small bore forming a flow-constricting duct between the other of said recesses and said first passageway, vacuum gauges respectively located in said two recesses, and absorbing material within said second passageway, said material being of a kind which absorbs the probe medium but does not absorb air.

7. In a leak detecting apparatus for detecting the presence of a probe medium in a vacuum system, the combination comprising inlet means defining a first passageway, a housing having wall sections defining a second passageway communicating with said first passageway and two recesses adjacent the second passageway, said wall sections having bores therein communicating between one of said recesses and one end of said second passageway and communicating between the other of said recesses and the remaining end of said second passageway with one of said bores having direct access to the first passageway defined by said inlet means, absorbing material disposed within said second passageway intermediate said bores, said absorbing material being of a kind which chemically absorbs the probe medium but does not absorb air, a first vacuum gage operatively connected to one of said recesses, and a second vacuum gage operatively connected to the remaining one of said recesses.

8. The combination set forth in claim 7 wherein said vacuum gages constitute Pirani gages having the hot wire elements thereof disposed within the respective recesses and electrically connected in a measuring circuit arrangement.

JACK BLEARS.
JOHN HENRY LECK.

References Cited in the file of this patent

UNITED STATES PATENTS

| Number | Name | Date |
|---|---|---|
| 1,644,951 | Rodhe | Oct. 11, 1927 |
| 2,263,335 | Heinz | Nov. 18, 1941 |
| 2,506,535 | Zaikowsky | May 2, 1950 |
| 2,507,321 | Sherwood | May 9, 1950 |

FOREIGN PATENTS

| Number | Country | Date |
|---|---|---|
| 824,090 | France | Feb. 1, 1938 |